(12) United States Patent
Senda et al.

(10) Patent No.: US 11,117,181 B2
(45) Date of Patent: Sep. 14, 2021

(54) METHOD OF MANUFACTURING LAMINATED IRON CORE

(71) Applicant: JFE STEEL CORPORATION, Tokyo (JP)

(72) Inventors: Kunihiro Senda, Tokyo (JP); Masanori Uesaka, Tokyo (JP); Yoshihiko Oda, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 255 days.

(21) Appl. No.: 16/082,698

(22) PCT Filed: Mar. 7, 2017

(86) PCT No.: PCT/JP2017/008886
§ 371 (c)(1),
(2) Date: Sep. 6, 2018

(87) PCT Pub. No.: WO2017/154860
PCT Pub. Date: Sep. 14, 2017

(65) Prior Publication Data
US 2019/0099800 A1 Apr. 4, 2019

(30) Foreign Application Priority Data
Mar. 11, 2016 (JP) .............................. JP2016-048149

(51) Int. Cl.
*H01F 3/04* (2006.01)
*B21D 43/09* (2006.01)
(Continued)

(52) U.S. Cl.
CPC ............. *B21D 43/09* (2013.01); *B21D 28/02* (2013.01); *B21D 28/22* (2013.01); *H01F 27/245* (2013.01);
(Continued)

(58) Field of Classification Search
CPC .. H02K 15/02; H02K 15/00; Y10T 29/49009; Y10T 29/49012; Y10T 29/53143;
(Continued)

(56) References Cited

U.S. PATENT DOCUMENTS

2017/0342519 A1* 11/2017 Uesaka ................. H02K 15/02
2018/0001369 A1* 1/2018 Senda .................. B21D 35/005

FOREIGN PATENT DOCUMENTS

| CN | 2470018 Y | 1/2002 |
| CN | 1733583 A | 2/2006 |

(Continued)

OTHER PUBLICATIONS

Jun. 12, 2019 Office Action issued in Chinese Application No. 201780016165.X.

(Continued)

*Primary Examiner* — Thiem D Phan
(74) *Attorney, Agent, or Firm* — Oliff PLC

(57) ABSTRACT

A method of manufacturing a laminated iron core includes: inserting a plurality of electrical steel strips in a superposed state to feed rolls including a pair of upper and lower feed rolls that are driven by a drive device to feed the electrical steel strips in a superposed state into a die having a plurality of punching processes in sequence; joining a part or all of the superposed electrical steel strips together before entering the die or at an upstream stage portion of the die after feeding out the electrical steel strips from the pair of upper and lower feed rolls; and punching simultaneously the plurality of electrical steel strips in a superposed state in the die.

8 Claims, 2 Drawing Sheets

(51) Int. Cl.
    *H02K 15/02*     (2006.01)
    *H01F 41/02*     (2006.01)
    *B21D 28/22*     (2006.01)
    *B21D 28/02*     (2006.01)
    *H01F 27/245*     (2006.01)

(52) U.S. Cl.
    CPC .......... *H01F 41/02* (2013.01); *H01F 41/024* (2013.01); *H01F 41/0233* (2013.01); *H02K 15/02* (2013.01); *Y10T 29/49078* (2015.01)

(58) Field of Classification Search
    CPC .......... Y10T 29/49078; Y10T 29/5317; B21D 43/09; C21D 8/1233; B26D 3/085
    USPC ....... 29/609, 423, 527.1, 596, 604, 605, 738
    See application file for complete search history.

(56) References Cited

FOREIGN PATENT DOCUMENTS

| | | |
|---|---|---|
| CN | 103316989 A | 9/2013 |
| JP | S48-39615 B1 | 11/1973 |
| JP | S52-39880 A | 3/1977 |
| JP | S52-126704 A | 10/1977 |
| JP | S55-156623 A | 12/1980 |
| JP | S57-156657 A | 9/1982 |
| JP | S60-015412 U | 2/1985 |
| JP | 2001-16832 A | 1/2001 |
| JP | 4472386 B2 | 6/2010 |
| JP | 2012-050989 A | 3/2012 |
| JP | 2012-231590 A | 11/2012 |

OTHER PUBLICATIONS

Jun. 6, 2017 International Search Report issued in International Patent Application No. PCT/JP2017/008886.

Feb. 27, 2020 Examination Report issued in Canadian Patent Application No. 3,017,445.

Jul. 18, 2019 Office Action issued in Canadian Application No. 3,017,445.

Mar. 6, 2019 Extended Search Report issues in European Patent Application No. 17763200.7.

* cited by examiner

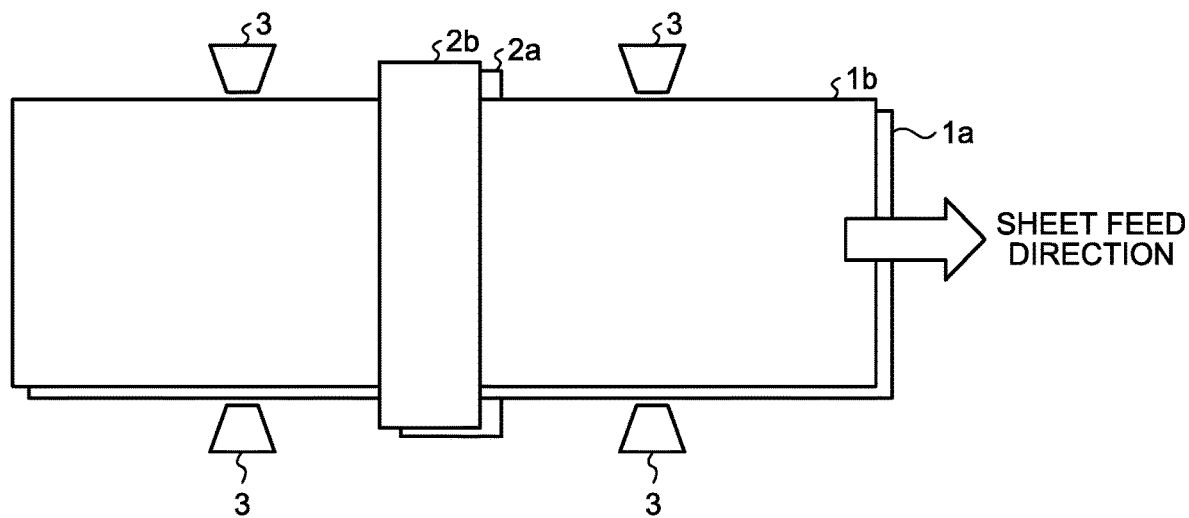
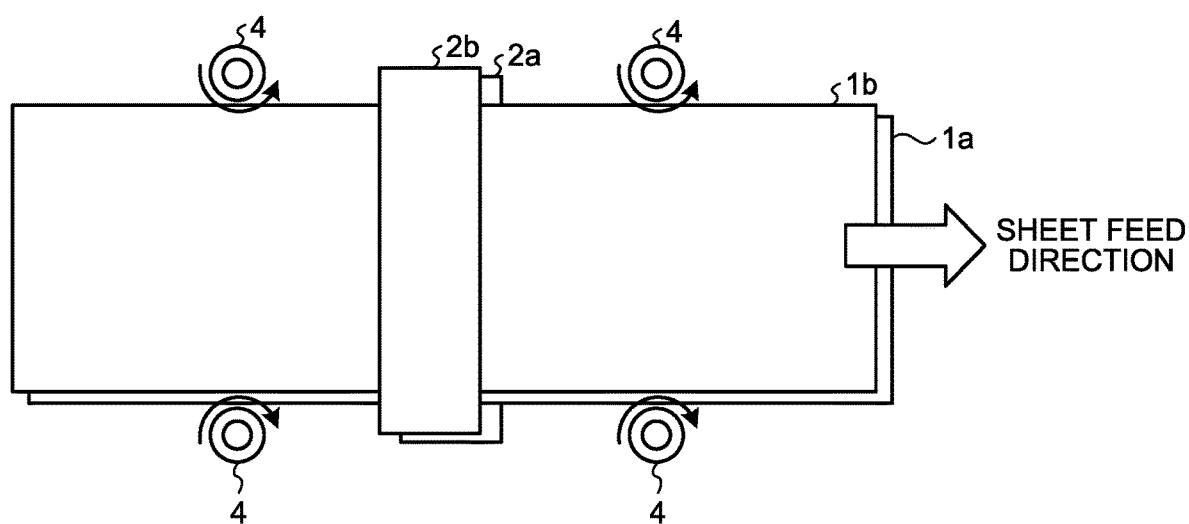

METHOD OF MANUFACTURING LAMINATED IRON CORE

FIELD

The present invention relates to a method and a device for manufacturing a laminated iron core.

BACKGROUND

In recent years, mainly in electric vehicles and hybrid electric vehicles, downsizing of an iron core has been desired, aiming for weight reduction of motors and generators, and to ensure output, an increasing number of revolutions (higher frequency) of the motor and the generator has been developing. Thus, in terms of iron loss of the iron core, a demand has been increasing for electrical steel sheets having a sheet thickness of 0.30 mm or less, which is thinner than before. In general, the iron cores for motors and generators are manufactured by punching an electrical steel sheet having a thin sheet thickness, which is a base material, to prevent eddy current loss.

In the punching process, a die for punching is set in a press machine, and while an electrical steel strip that has been slit in a predetermined width is fed into the die with a feeding device, each portion of the iron core is punched. Then, the iron core fragments are swaged in the die to be integrated, or the iron core fragments after being punched from the die are integrated by being welded or fixed by bolt, to be manufactured into the iron core. Such an iron core that is manufactured by laminating and integrating the electrical steel strips having a thin sheet thickness is hereinafter referred to as "laminated iron core".

The above-described punching process is generally used because it is excellent in productivity. However, in an ordinary punching process, because it is necessary to punch one iron core fragment at a time, the efficiency of punching drastically falls as the sheet thickness of the electrical steel strip becomes thinner. Against this background, techniques to punch the electrical steel strips with a plurality of electrical steel strips superposed have been developed (see Patent Literature 1 and Patent Literature 2). In the following description, an electrical steel strip of a plurality of electrical steel strips before being superposed and joined together is referred to as "base steel strip", and the plurality of electrical steel strips after being joined are referred to as "joined steel strips".

CITATION LIST

Patent Literature

Patent Literature 1: Japanese Patent Application Laid-open No. S52-039880
Patent Literature 2: Japanese Patent Application Laid-open No. S52-126704
Patent Literature 3: Japanese Patent No. 4472386

SUMMARY

Technical Problem

An industrial manufacturing process of iron cores generally uses a die referred to as a progressive die that has a plurality of punching processes in the die to manufacture the final iron cores while sequentially feeding the base steel strips in the die. When the above-described conventional technique is applied to the iron core manufacturing process by the die aiming for such high efficiency production, the thin sheet of the base steel strip causes the base steel strip to droop inside the die and makes it impossible to stably perform the continuous punching process with the base steel strip, interfering with a lower side of the die arises.

To solve such a problem, it is conceivable to prevent the base steel strip from drooping inside the die by joining a portion or all of the base steel strips to each other to form joined steel strips before the problem arises and improving the rigidity of the base steel strips. Patent Literature 1 and Patent Literature 3 describe techniques of performing the punching process after joining the base steel strips to each other, which are not necessarily based on such a viewpoint.

In detail, Patent Literature 1 describes, in a method of pressing by piling and feeding two steel sheets, the method of press working in which the steel sheets are pressed after portions to be scrapped are integrated by swaging or by welding. Furthermore, Patent Literature 3 describes a technique that provides coalescence locking portions for fixing on an iron-core forming portion and an iron-core non-forming portion, and that flattens the coalescence locking portions by pushing back. The techniques described in Patent Literature 1 and Patent Literature 3 are to avoid various problems that arise by steel sheets not being integrated with each other when the plurality of steel sheets are simultaneously fed into the die.

When a plurality of superposed base steel strips are joined together, the use of the up-and-down movement of a press machine excels in terms of simplicity, and it is preferable that the base steel strips be joined by swaging or applying an adhesive, at an upstream stage of the die installed in the press machine, or immediately before entering the die. In particular, when swaging is provided, because unevenness is formed on the surface of the base steel strip, it is preferable that the base steel strips be joined on the downstream side of the feed roll.

However, when joining the base steel strips together, if the plurality of superposed base steel strips shift in the width direction before being joined together, the base steel strips are joined in a shifted state in the width direction as is. As a result, the width of the joined steel strips is increased more than the width of the joined steel strips that the die is assumed, and troubles such as collision of the joined steel strips onto the inner wall of the die of the press machine are triggered and the continuous punching process is compelled to stop.

It is conceivable to widen the inner wall of the die so as to allow the shift of the base steel strip in the width direction. However, when the inner wall of the die is widened, the position of the base steel strip is unstable. As a result, problems that the positional relation between a pilot pin and a pilot hole that determine the press position is misaligned, and that the width of trim bridge is not sufficiently secured may arise.

From the above, in a method of punching after joining the base steel strips together to perform punching of the base steel strips of a thin sheet thickness at high speed and with high efficiency, it is necessary to join the base steel strips together while preventing the base steel strips from shifting in the width direction even when the base steel strips are fed at high speed by a feed roll.

The present invention has been made in consideration of the above-described problems, and an object thereof is to provide a method and a device for manufacturing a laminated iron core capable of manufacturing a laminated iron core by joining a plurality of electrical steel strips together while preventing the electrical steel strips from shifting in the width direction even when the electrical steel strips are fed at high speed by a feed roll.

Solution to Problem

To solve the problem and achieve the object, a laminated iron core manufacturing method according to the present invention is a method of manufacturing a laminated iron core by inserting a plurality of electrical steel strips in a superposed state to a pair of upper and lower feed rolls such that the electrical steel strips in a superposed state are fed into a die having a plurality of punching processes in sequence, and by simultaneously punching the plurality of electrical steel strips in a superposed state in the die, the method including: a joining step of joining a part or all of the superposed electrical steel strips together before entering the die or at an upstream stage portion of the die, after the electrical steel strips are fed out from the pair of upper and lower feed rolls by using feed rolls for which both upper and lower feed rolls are driven by a drive device as the pair of upper and lower feed rolls.

Moreover, in the laminated iron core manufacturing method according to the present invention, surface roughness Ra of the pair of upper and lower feed rolls is 0.3 μm or more.

Moreover, in the laminated iron core manufacturing method according to the present invention, a shift correction mechanism that corrects shift in a width direction of the electrical steel strips is installed at a position within 700 mm from a biting position of the pair of upper and lower feed rolls in a conveying direction of electrical steel strips.

Moreover, in the laminated iron core manufacturing method according to the present invention, a rolling force applied to the pair of upper and lower feed rolls is controlled within a range of more than or equal to 1000 N and less than or equal to 2500 N.

Moreover, a manufacturing device for manufacturing a laminated iron core according to the present invention manufactures a laminated iron core by using the laminated iron core manufacturing method according to the present invention.

Advantageous Effects of Invention

According to the method and the device for manufacturing a laminated iron core in the present invention, it is possible to manufacture a laminated iron core by joining a plurality of electrical steel strips together while preventing the electrical steel strips from shifting in the width direction even when the electrical steel strips are fed at high speed by the feed rolls.

BRIEF DESCRIPTION OF DRAWINGS

FIG. 3 is a schematic diagram illustrating a configuration of one example of a shift correction mechanism.

FIG. 4 is a schematic diagram illustrating a configuration of another example of the shift correction mechanism.

DESCRIPTION OF EMBODIMENT

The inventors of the present invention have found that, as a result of earnest studies on a method for solving troubles due to lack of rigidity when a plurality of superposed base steel strips having a thin sheet thickness are punched, it is preferable to perform punching after joining a part or all of the base steel strips to each other, before entering a die or at an upstream process of the die, after being fed out from a feed roll, and have found that, at this time, troubles due to joining together the base steel strips being shifted in the width direction often occur. Then, the inventors of the present invention have found that, as a result of earnest investigations of the cause of such shift of the base steel strip in the width direction, there is a problem in the structure of a feed roll that is normally used.

Figure 1:
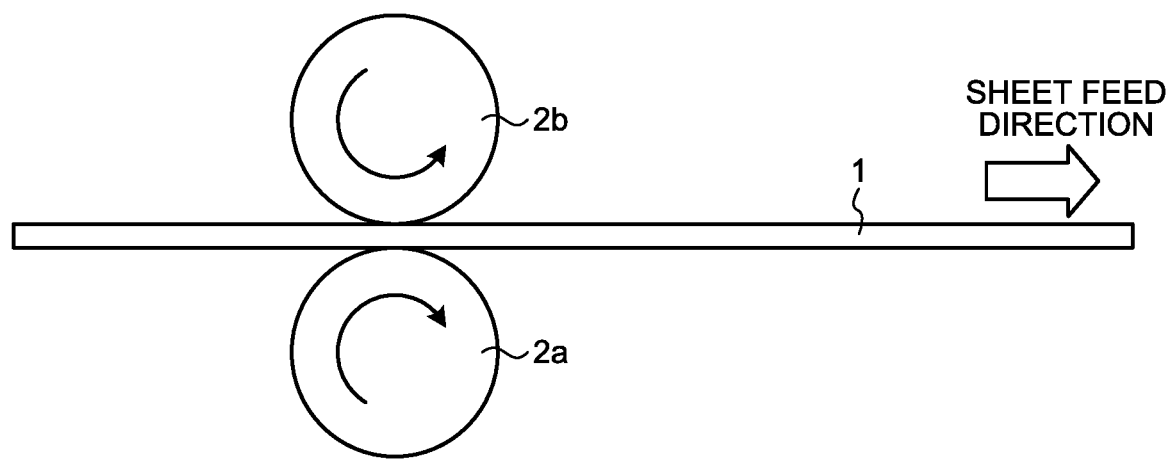
FIG. 1 is a schematic diagram illustrating a configuration of a pair of upper and lower feed rolls in a case of feeding one base steel strip.
Figure 2:
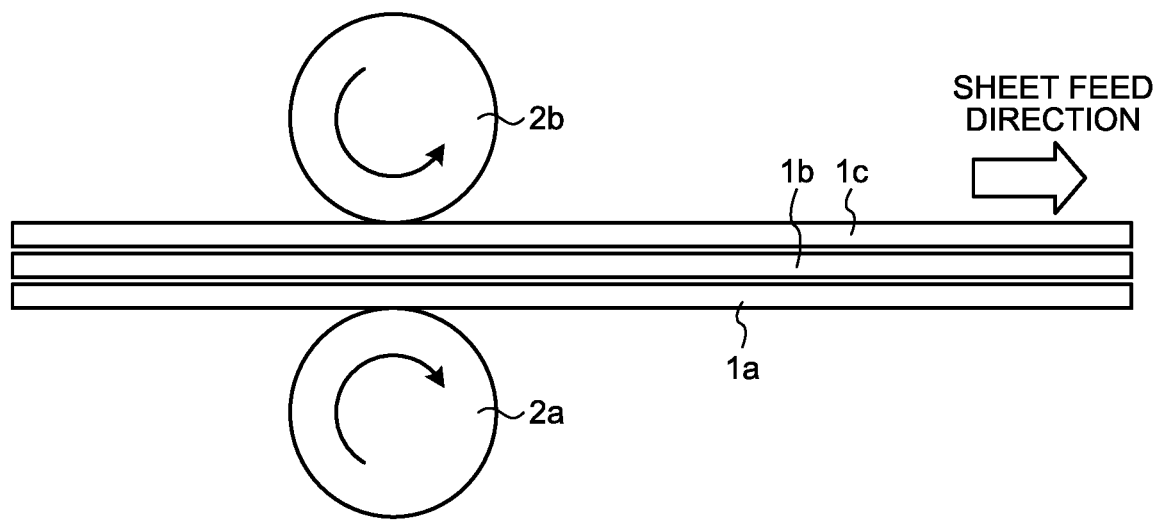
FIG. 2 is a schematic diagram illustrating a configuration of a pair of upper and lower feed rolls in a case of feeding a plurality of base steel strips.

That is, as illustrated in FIG. 1, in a common feed roll, only a lower roll $2a$ is driven by a drive device, and an upper roll $2b$ is only rotated. In an ordinary punching process, because a base steel strip 1 is fed in a state of one sheet, there is no problem even when a feed roll for which only a roll on one side is driven is used. Meanwhile, as illustrated in FIG. 2, in a case where a plurality of base steel strips $1a$, $1b$, and $1c$ are simultaneously fed into a feed roll and fed out to a die, when the lower roll $2a$ is a drive roll and the upper roll $2b$ is a driven roll, the base steel strip $1a$ on the lower roll $2a$ side is brought into direct contact with the lower roll $2a$, thereby being given a feeding force. On the other hand, the base steel strip $1b$ that is not in contact with the lower roll $2a$ receives a force in the feed direction by the frictional force between the base steel strip $1b$ and the base steel strip $1a$. Similarly, the base steel strip $1c$ receives a force in the feed direction by the frictional force between the base steel strip $1c$ and the base steel strip $1b$, and the upper roll $2b$ receives a force by the frictional force between the upper roll $2b$ and the base steel strip $1c$ and rotates.

As just described, in feeding the plurality of base steel strips in a superposed state, when only the lower roll is driven, the feeding force is transmitted by the frictional force in sequence from the base steel strip on the lower side to the base steel strip on the upper side. At this time, because there are minute undulations on the surface of the base steel strip, the entire surfaces of the base steel strips are not necessarily in close contact to each other uniformly. Thus, the inventors of the present invention have concluded that the manner of transmitting the feeding force becomes asymmetric in the axial direction of the feed roll (width direction of the base steel strip), and that such asymmetry is increased as the feeding force is transmitted in sequence from the base steel strip on the lower side to the base steel strip on the upper side, and develops the shift of the base steel strip in the width direction.

Consequently, the inventors of the present invention have conceived that, as a solution to such a phenomenon, the upper roll is made to have a mechanism that actively rotates in synchronization with the lower roll. That is, the inventors of the present invention have conceived that, by transmitting the feeding force upward from the lower roll in sequence and by simultaneously transmitting the feeding force downward from the upper roll, the asymmetry of the feeding force by the frictional force between the base steel strips is eliminated and that the shift in the width direction between the base steel strips is prevented.

Conventionally, a feeding device that drives both upper and lower feed rolls has been available. However, such a feeding device is aimed at finely controlling the feeding amount of the base steel strip, and there is no example that uses it for punching in which a plurality of base steel strips are superposed and fed as in the present invention. The present invention is based on the above-described technical idea. However, in addition to the above-described feed rolls, by controlling the roughness of the surface of the feed rolls, by installing a mechanism that prevents the shift of the base steel strip in the width direction, and by further controlling the rolling force of the feed rolls, it is possible to sufficiently prevent the phenomenon in which the plurality of base steel strips shift in the width direction, and to stably perform punching process.

As a technique to produce an iron core from a base steel strip with high efficiency (fast production speed), when superposing and punching a plurality of base steel strips, a method that joins the plurality of base steel strips to each other immediately before a die or at an upstream stage of the die is suitable. When the sheet thickness of the base steel strip is thinner, the rigidity thereof in the die is less and that is likely to lead to the troubles during punching, and thus it is desirable that the base steel strip be conveyed in the die after joining the base steel strips to each other. The above-described troubles during the punching depend on not only the sheet thickness of the base steel strip but also the size of the iron core obtained by the punching. Thus, the troubles are likely to occur in punching of the iron core having, roughly speaking, a sheet thickness of 0.30 mm or less and an outer shape of 120 mm or more.

First, in the present invention, a pair of upper and lower feed rolls used in punching is of upper-and-lower-roll drive system. When a feed roll that has been used in standard conventionally and for which only one side of the upper side and the lower side is driven is used, by the frictional force between the base steel strips, while the feeding force is transmitted between the superposed base steel strips and between the base steel strip and the driven roll, due to the undulations on the surface of the base steel strip and the non-uniformity in the friction coefficient, the feeding force becomes non-uniform in the width direction and the shift occurs in the width direction of the base steel strip.

Meanwhile, when a feed roll of upper-and-lower-roll drive system is used, even when there are undulations on the surface of the base steel strip, and non-uniformity in the friction coefficient, a phenomenon in which a plurality of base steel strips shift in the width direction at the position of the feed roll is prevented and a problem caused by the widened apparent width of the superposed base steel strips is less likely to occur. The feed roll of upper-and-lower-roll drive system means a pair of upper and lower feed rolls for which both feed rolls that come in contact with the base steel strip are coupled to a drive device, are actively driven, and are adjusted so that the operation timing of both is simultaneous. By driving the feed rolls by a servo motor and optimally controlling the feed rate and feed pattern of the base steel strips, it is possible to further enhance the effect of the present invention.

It is desirable that the surface roughness Ra of the pair of upper and lower feed rolls be 0.3 µm or more. By making the surface roughness Ra of the pair of upper and lower feed rolls be 0.3 µm or more, it is possible to further enhance the stability of the continuous punching process. By increasing the surface roughness of the feed rolls, the feeding force from the feed rolls that come in contact with the base steel strips from the upper side and the lower side is accurately transmitted to the base steel strips, and the shift of the base steel strips is prevented.

When the surface roughness Ra of the feed roll is below 0.3 µm, the frictional coefficient between the feed roll and the base steel strip decreases, the feed rate by the pair of upper and lower feed rolls is not stabilized, and the base steel strip is likely to shift in the width direction. It is desirable that the upper limit of the surface roughness Ra of the feed rolls be 3 µm. When the surface roughness Ra of the feed roll exceeds 3 µm, the contact state and pressed state between the base steel strip and the feed roll become non-uniform and the magnetic properties degrade.

In addition to the requirements of the upper-and-lower-roll drive and the surface roughness, it is desirable to provide a shift correction mechanism that corrects the shift of the base steel strips in the width direction. By providing the shift correction mechanism, the stability in continuous punching is further enhanced. This is because the shift of the base steel strip in the width direction is likely to occur due to the deviation in the sheet thickness and the like of the base steel strips, even when the feed rolls are driven together on both upper side and lower side and further properly controlling the surface roughness of the feed rolls. In this case, when the feed rolls of upper-and-lower-roll drive system is used, the shift correction mechanism operates effectively because the basic amount of shift is small, and it is possible to accurately align the width direction positions of the base steel strips.

As for the shift correction mechanism, as illustrated in FIG. 3 and FIG. 4, a system that presses members 3 (see FIG. 3) or rotating rolls 4 (see FIG. 4) to the width-direction end portions of the base steel strips is effective. In such a system, if the original amount of shift of the base steel strip in the width direction is large, because of the lack of rigidity of the base steel strip after the shift, the base steel strip is deformed before the position of the base steel strip is corrected, thereby making it difficult to correct the position in the width direction. Meanwhile, when the base amount of shift of the base steel strip is reduced with the feed rolls of upper-and-lower-roll drive system, it is possible to correct the position in the width direction while preventing the deformation of the base steel strip, even when the base steel strip is pressed from the width-direction end portions thereof by the shift correction mechanism.

It is desirable that such a shift correction mechanism be installed in a range of 700 mm or less, preferably 400 mm or less, in the conveying direction of the electrical steel strip from the biting position of the feed rolls. Because the shift of the base steel strip in the width direction occurs at the biting position of the feed rolls, even if the positional shift in the width direction is forcibly corrected at a position away from the biting position of the feed rolls, it will not lead to drastic improvement. Meanwhile, by installing the shift correction mechanism at a proximity position of 700 mm or less from the biting position of the feed rolls, it is possible to prevent the shift of the base steel strip in the width direction at the biting position of the feed rolls.

Although there is an effect even when the shift correction mechanism is installed at a position exceeding 700 mm from the biting position of the feed rolls, because the base steel strip warps toward the lateral side between the shift correction mechanism and the feed rolls, the corrective action on the shift in the width direction at the biting position of the feed rolls is reduced. It is further effective that the shift correction mechanisms are installed at both inlet side and outlet side of the feed rolls. Moreover, by installing a plurality of shift correction mechanisms each at the inlet side and the outlet side, it is possible to easily correct the width direction position of the base steel strip without deforming the base steel strip in which the shift has occurred. When a plurality of shift correction mechanisms are installed, it is effective that as many shift correction mechanisms as possible are installed at positions within 700 mm from both of the inlet side and the outlet side of the feed rolls.

It is desirable that the rolling force applied to the feed rolls be within a range more than or equal to 1000 N and less than or equal to 2500 N. As for the feeding of the base steel strip in a conventional punching process, the rolling force is not particularly limited, and because the slippage between the base steel strip and the feed roll is prevented when a strong rolling force within a range not adversely affecting the magnetic properties is applied, the rolling force applied to the feed rolls has generally been more than or equal to 3000 N. Meanwhile, the inventors of the present invention have found that the feed rolls of upper-and-lower-roll drive system enables the rolling force applied to the feed rolls to be lower than that of the conventional case, thereby stably providing continuous press.

Specifically, in the feed rolls of upper-and-lower-roll drive system, the feed rolls are brought into contact with the superposed base steel strips from the up-and-down direction, and thus a large rolling force is not needed as compared with the conventional case, and a large rolling force can increase the shift in the width direction when the base steel strips used have width-direction uniformity such as sheet thickness deviation. Meanwhile, the result of study of the inventors of the present invention revealed that by lowering the rolling force of the feed rolls the shift in the width direction between the base steel strips, and the continuous press workability was stabilized. When the width direction position of the base steel strips is to be aligned with high precision by adding the shift correction mechanism, the rolling force of the feed rolls that is weakened as compared with the conventional case causes the function of correcting the width direction position of the base steel strip, which tries to shift, at the biting position of the feed rolls by the shift correction mechanism to work effectively.

Because of the above-described reasons, by lowering the rolling force of the feed rolls as compared with the conventional case, it is possible to prevent the shift in the width direction between the base steel strips when punching is performed on the superposed base steel strips simultaneously. Thus, the upper limit of the rolling force is preferably 2500 N, and is more preferably 2000 N. Meanwhile, if the rolling force is made too weak, the holding force at the feed rolls may become insufficient, and the feed rate of the base steel strip becomes unstable, or the shift in the width direction of the base steel strip easily occurs. Thus, the lower limit of the rolling force of the feed rolls is set to 1000 N.

A device for manufacturing a laminated iron core having the above-described functions is configured as follows. That is, the device for manufacturing a laminated iron core according to the present invention includes a device having functions of dispensing and feeding base steel strips, which dispenses a plurality of base steel strips from a coil and superposes to feed the plurality of base steel strips to feed rolls, a pair of upper and lower feed rolls, a device having a function of integrating the plurality of base steel strips before entering a die from the feed rolls or at an upstream process in the die, the die that provides punching on the plurality of base steel strips in a superposed state, and a drive device that actively drives the pair of upper and lower feed rolls.

It is desirable that the surface roughness Ra of the feed rolls be 0.3 μm or more. Furthermore, it is desirable that a shift correction mechanism that corrects shift in the width direction of the plurality of superposed base steel strips be provided on at least one side of the inlet side and the outlet side of the feed rolls and the shift correction mechanism be installed at a position within 700 mm from the biting position of the feed rolls in the conveying direction of the base steel strips. Moreover, it is desirable that the rolling force of the feed rolls be controlled within a range of more than or equal to 1000 N and less than or equal to 2500 N.

EXAMPLES

Example 1

For a stator core having an iron core outer diameter of 200 mm, a back yoke width of 14 mm, and a tooth length of 25 mm, two base steel strips (205 mm in width) having a sheet thickness of 0.20 mm were superposed before the inlet side of a press machine (before feed rolls) and then fed into a die in sequence, and after two base steel strips were joined together by simultaneously swaging the two base steel strips at the first process of the press in the die, continuous punching was performed at a punching speed of 170 strokes per minute (SPM). At this time, the drive system of the feed rolls was performed by two systems of (a) driving of only one side roll (one side drive), and of (b) driving of both side rolls (upper-and-lower-roll drive), and both systems were compared. Furthermore, in (b) the driving of both side rolls, the surface roughness of the feed rolls and the rolling force to the feed rolls were varied. At positions before and after the feed rolls (before means before the base steel strips enter the feed rolls, and after means after the base steel strips are fed out from the feed rolls), guides for preventing and correcting the shift in the width direction of the two base steel strips were provided, and the guide positions were varied. In the press work performed by the above-described method, the number of punching times until the press is stopped due to the occurrence of a trouble was counted with the upper limit of the number of press times set to 5000 times. The counting result is illustrated in Table 1.

TABLE 1

| Feed Roll Drive System | Roll Surface Roughness Ra (μm) | Sheet Shift Prevention Guide | Sheet Shift Prevention Guide Position (Inlet Side) | Sheet Shift Prevention Guide Position (Outlet Side) | Feed Roll Rolling Force (N) | Number Of Continuous Press Times Until Trouble Stop | Remarks |
|---|---|---|---|---|---|---|---|
| One Side Drive | 0.5 | Absent | — | — | 3000 | 633 | Comparative |
| One Side Drive | 0.5 | Present | 700 mm | — | 3000 | 912 | Comparative |
| Upper And Lower Drive | 0.1 | Absent | — | — | 3000 | 2004 | Invention Example |
| Upper And Lower Drive | 0.2 | Absent | — | — | 3000 | 2225 | Invention Example |
| Upper And Lower Drive | 0.3 | Absent | — | — | 3000 | 3999 | Invention Example |
| Upper And Lower Drive | 0.5 | Absent | — | — | 3000 | 5000 | Invention Example |
| Upper And Lower Drive | 1 | Absent | — | — | 3000 | 5000 | Invention Example |
| Upper And Lower Drive | 0.2 | Present | 900 mm | — | 3000 | 3047 | Invention Example |
| Upper And Lower Drive | 0.2 | Present | 900 mm | 900 mm | 3000 | 3114 | Invention Example |

TABLE 1-continued

| Feed Roll Drive System | Roll Surface Roughness Ra (μm) | Sheet Shift Prevention Guide | Sheet Shift Prevention Guide Position (Inlet Side) | Sheet Shift Prevention Guide Position (Outlet Side) | Feed Roll Rolling Force (N) | Number Of Continuous Press Times Until Trouble Stop | Remarks |
|---|---|---|---|---|---|---|---|
| Upper And Lower Drive | 0.2 | Present | 700 mm | — | 3000 | 3212 | Invention Example |
| Upper And Lower Drive | 0.2 | Present | 700 mm | 900 mm | 3000 | 3566 | Invention Example |
| Upper And Lower Drive | 0.2 | Present | 700 mm | 900 mm | 3000 | 4209 | Invention Example |
| Upper And Lower Drive | 0.2 | Present | 350 mm | — | 3000 | 4925 | Invention Example |
| Upper And Lower Drive | 0.2 | Present | 350 mm | 900 mm | 3000 | 5000 | Invention Example |
| Upper And Lower Drive | 0.2 | Present | 350 mm | 350 mm | 3000 | 5000 | Invention Example |
| Upper And Lower Drive | 0.2 | Absent | — | — | 2500 | 4044 | Invention Example |
| Upper And Lower Drive | 0.2 | Absent | — | — | 2000 | 5000 | Invention Example |
| Upper And Lower Drive | 0.2 | Absent | — | — | 1000 | 5000 | Invention Example |
| Upper And Lower Drive | 0.2 | Absent | — | — | 600 | 1229 | Invention Example |
| Upper And Lower Drive | 0.5 | Present | 900 mm | 900 mm | 3000 | 5000 | Invention Example |
| Upper And Lower Drive | 0.5 | Present | 700 mm | 900 mm | 3000 | 5000 | Invention Example |
| Upper And Lower Drive | 0.5 | Present | 350 mm | 900 mm | 3000 | 5000 | Invention Example |
| Upper And Lower Drive | 0.5 | Absent | — | — | 2000 | 5000 | Invention Example |
| Upper And Lower Drive | 0.2 | Present | 350 mm | 900 mm | 2000 | 5000 | Invention Example |
| Upper And Lower Drive | 0.5 | Present | 350 mm | — | 2000 | 5000 | Invention Example |

As illustrated in Table 1, when the press work was performed under the condition (device) that conforms to the present invention, no troubles occurred during the press work of 1000 times or more, and it was possible to perform the press work continuously. Furthermore, by combining a plurality of conditions prescribed in the present invention, it was possible to perform continuous press of 3000 times or more.

Example 2

For a stator core having an iron core outer diameter of 180 mm, a back yoke width of 10 mm, and a teeth length of 18 mm, on three base steel strips (190 mm in width) having a sheet thickness of 0.12 mm, a process that serves as both of the feeding of the base steel strips and the progress of adhesive was performed, by applying an adhesive between layers and superposing the base steel strips before the inlet side of a press machine (before feed rolls), and then by pinching the base steel strips from the up-and-down direction by the rotating feed rolls. Then, by feeding the base steel strips into a die in sequence, continuous punching was performed at a punching speed of 150 SPM by a punching die. At this time, the curing of the adhesive (adhesion between the base steel strips) was completed immediately after being fed out from the feed rolls. Then, the drive system of the feed rolls was performed by two systems of (a) driving of only one side roll (one side drive), and of (b) driving of both side rolls (upper-and-lower-roll drive), and both systems were compared. Furthermore, in (b) the driving of both side rolls, the surface roughness of the feed rolls and the rolling force to the feed rolls were varied. At positions before and after the feed rolls, guides for preventing and correcting the shift in the width direction of three base steel strips were provided, and the guide positions were varied. In the press work performed by the above-described method, the number of punching times until the press is stopped due to the occurrence of a trouble was counted with the upper limit of the number of press times set to 5000 times. The counting result is illustrated in Table 2.

TABLE 2

| Feed Roll Drive System | Roll Surface Roughness Ra (μm) | Sheet Shift Prevention Guide | Sheet Shift Prevention Guide Position (Inlet Side) | Sheet Shift Prevention Guide Position (Outlet Side) | Feed Roll Rolling Force (N) | Number Of Continuous Press Times Until Trouble Stop | Remarks |
|---|---|---|---|---|---|---|---|
| One Side Drive | 0.4 | Present | — | 700 mm | 2000 | 881 | Comparative |
| Upper And Lower Drive | 0.1 | Absent | — | — | 2000 | 3033 | Invention Example |
| Upper And Lower Drive | 0.4 | Present | — | 700 mm | 2000 | 5000 | Invention Example |
| Upper And Lower Drive | 0.4 | Absent | — | — | 2000 | 4111 | Invention Example |
| Upper And Lower Drive | 0.1 | Absent | — | — | 3000 | 2245 | Invention Example |
| Upper And Lower Drive | 0.1 | Present | — | 900 mm | 3000 | 2454 | Invention Example |
| Upper And Lower Drive | 0.1 | Present | — | 350 mm | 3000 | 3582 | Invention Example |
| Upper And Lower Drive | 0.2 | Present | 900 mm | 350 mm | 1500 | 4698 | Invention Example |

As illustrated in Table 2, when the press work was performed under the condition (device) that conforms to the present invention, no troubles occurred during the press work of 2000 times or more, and it was possible to perform the press work continuously.

INDUSTRIAL APPLICABILITY

According to the present invention, it is possible to provide a method and a device for manufacturing a laminated iron core capable of manufacturing a laminated iron core by joining a plurality of electrical steel strips together while preventing the electrical steel strips from shifting in the width direction even when the electrical steel strips are fed at high speed by feed rolls.

REFERENCE SIGNS LIST 1, 1a, 1b, 1c BASE STEEL STRIP
2a, 2b FEED ROLL
3 MEMBER
4 ROLL

The invention claimed is:

1. A method of manufacturing a laminated iron core, the method comprising:
    inserting a plurality of electrical steel strips in a superposed state to feed rolls including a pair of upper and lower feed rolls that are driven by a drive device to feed the electrical steel strips in a superposed state into a die having a plurality of punching processes in sequence;
    joining a part or all of the superposed electrical steel strips together before entering the die or at an upstream stage portion of the die after feeding out the electrical steel strips from the pair of upper and lower feed rolls; and
    punching simultaneously the plurality of electrical steel strips in a superposed state in the die,
    wherein the upper feed roll rotates in synchronization with the lower feed roll, and
    an operation timing of the upper feed roll and the lower feed roll is adjusted to be simultaneous.

2. The method according to claim 1, wherein surface roughness Ra of the pair of upper and lower feed rolls is 0.3 μm or more.

3. The method according to claim 2, further comprising correcting, by a shift correction mechanism installed at a position within 700 mm from a biting position of the pair of upper and lower feed rolls in a conveying direction of electrical steel strips, shift in a width direction of the electrical steel strips.

4. The method according to claim 3, wherein a rolling force applied to the pair of upper and lower feed rolls is controlled within a range of more than or equal to 1000 N and less than or equal to 2500 N.

5. The method according to claim 2, wherein a rolling force applied to the pair of upper and lower feed rolls is controlled within a range of more than or equal to 1000 N and less than or equal to 2500 N.

6. The method according to claim 1, further comprising correcting, by a shift correction mechanism installed at a position within 700 mm from a biting position of the pair of upper and lower feed rolls in a conveying direction of electrical steel strips, shift in a width direction of the electrical steel strips.

7. The method according to claim 6, wherein a rolling force applied to the pair of upper and lower feed rolls is controlled within a range of more than or equal to 1000 N and less than or equal to 2500 N.

8. The method according to claim 1, wherein a rolling force applied to the pair of upper and lower feed rolls is controlled within a range of more than or equal to 1000 N and less than or equal to 2500 N.

* * * * *